United States Patent
Mrowiec et al.

(10) Patent No.: US 12,126,762 B2
(45) Date of Patent: Oct. 22, 2024

(54) SYSTEM AND METHOD FOR TRACKING AND DISPLAY OF COMPLIANCE WITH INSTRUCTIONS PROVIDED BY EMERGENCY CALL TAKER

(71) Applicant: MOTOROLA SOLUTIONS, INC., Chicago, IL (US)

(72) Inventors: Robert Mrowiec, Liszki (PL); Piotr Fiszer, Czestochowa (PL); Mateusz Smetek, Skala (PL); Andrzej Bukowski, Tarnobrzeg (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 107 days.

(21) Appl. No.: 17/904,306

(22) PCT Filed: Jun. 3, 2020

(86) PCT No.: PCT/PL2020/050044
§ 371 (c)(1),
(2) Date: Aug. 16, 2022

(87) PCT Pub. No.: WO2021/246880
PCT Pub. Date: Dec. 9, 2021

(65) Prior Publication Data
US 2023/0083108 A1    Mar. 16, 2023

(51) Int. Cl.
*H04M 11/04*    (2006.01)
*H04M 3/22*    (2006.01)
*H04M 3/51*    (2006.01)

(52) U.S. Cl.
CPC ....... *H04M 3/2281* (2013.01); *H04M 3/5116* (2013.01)

(58) Field of Classification Search
CPC .............................. H04M 3/22; H04M 3/5116
See application file for complete search history.

(56) References Cited

U.S. PATENT DOCUMENTS

| | | | |
|---|---|---|---|
| 10,276,031 B1* | 4/2019 | Ho | G10L 25/63 |
| 10,276,931 B1 | 4/2019 | Ho et al. | |
| 10,306,059 B1 | 5/2019 | Bondareva et al. | |
| 10,701,542 B2* | 6/2020 | Martin | H04L 67/02 |
| 10,943,456 B1* | 3/2021 | Carbonell | G08B 5/223 |
| 11,095,693 B1* | 8/2021 | Wehrung | H04L 65/1089 |
| 2011/0144996 A1 | 6/2011 | Ma et al. | |
| 2014/0088780 A1* | 3/2014 | Chen | H02J 13/00004 |
| | | | 700/295 |
| 2014/0294161 A1 | 10/2014 | O'Conor et al. | |
| 2015/0302323 A1 | 10/2015 | Connolly | |
| 2018/0310159 A1* | 10/2018 | Katz | H04W 4/90 |
| 2019/0197354 A1 | 6/2019 | Law et al. | |
| 2020/0126174 A1* | 4/2020 | Halse | G06Q 50/265 |

OTHER PUBLICATIONS

The International Search Report and the Written Opinion, corresponding patent application No. PCT/2020/050044, filed: Jun. 3, 2020, mailed: Feb. 18, 2021, all pages.

* cited by examiner

*Primary Examiner* — Simon King (57) ABSTRACT

Techniques for tracking and display of compliance with instructions provided by emergency call takers are provided. An artificial intelligence (AI) bot monitors a conversation between an emergency caller and an emergency call taker. The AI bot identifies at least one instruction issued by the emergency call taker to the emergency caller. The AI bot determines when execution of the at least one instruction has been confirmed.

20 Claims, 5 Drawing Sheets

SYSTEM AND METHOD FOR TRACKING AND DISPLAY OF COMPLIANCE WITH INSTRUCTIONS PROVIDED BY EMERGENCY CALL TAKER

BACKGROUND

Many localities around the world provide a system for the public to rapidly request assistance in case of an emergency. For example, in the United States of America the 9-1-1 system may be used to request assistance from police, fire, or emergency medical services (EMS) first responders by simply dialing 911 on any telephone, including both landline and wireless telephones. The United Kingdom provides similar functionality through the 9-9-9 system. Other localities may provide similar functionality through locally known emergency phone numbers.

Typically, calls to the emergency phone number are routed to a call center that may also be referred to as a public safety answering point (PSAP). Some roles of personnel at a PSAP can include call taker (e.g. answering incoming calls), dispatchers (e.g. dispatching first responders such as police, fire, and EMS), translator, coordinator (e.g. coordinating between public safety and other agencies), records entry (e.g. transcribing information related to the call), and any number of other tasks. In many PSAPs, there is not a one to one mapping of role to an individual person. In some PSAPs, a single person may perform anywhere from one to all the responsibilities of each role. For example, a call taker may communicate with the caller and also act as a dispatcher as well as be responsible for coordinating with public safety and other agencies.

In some cases, a caller to a PSAP may be instructed to perform certain actions. For example, in an active shooter incident in a school, a teacher that has called 911 may be instructed by the call taker to lock the classroom door, keep everybody away from the windows, and to try to keep everyone calm. In a health emergency, such as a person in need of cardio pulmonary resuscitation (CPR), the caller may be instructed to provide chest compressions and then periodically check to see if the patient has regained a pulse. Generally field personnel (e.g. police, fire, ems, etc.) are referred to as first responders. However, emergency number callers could also be referred to as the "first" first responders. Actions taken by an emergency number caller may have a profound effect on the outcome of any given emergency situation.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Traditional first responder (e.g. police, fire, ems, etc.) personnel are well trained to perform the actions that are needed when responding to an emergency situation. Emergency number callers, who can also be referred to as emergency callers or 911 callers, are typically civilians and would have no training in how to respond to a given emergency situation or what actions need to be taken. Furthermore, calling 911 is not a typical action for most civilians. In many cases, the situation that is occurring that has prompted the 911 call may be one of the most traumatic situations the caller has ever been involved with in their entire lives.

To alleviate some of these issues related to civilian 911 callers, 911 call takers are trained to provide instructions to the 911 callers while they wait for first responders to arrive. As mentioned above, in an active shooter incident, the 911 caller may be instructed to lock the door, stay away from windows, etc. The remainder of this description will be in terms of a 911 call taker interacting with a person at a school that currently has an active shooter situation. However, it should be understood that the techniques described herein are applicable to any situation where the 911 call taker is providing instructions to the 911 caller.

A problem arises in that an untrained civilian, who may be scared, nervous, anxious, etc., may not always properly acknowledge and/or execute the instructions provided by the 911 call taker. For example, an instruction to lock the door may not be heard or followed by a civilian due to panic. In addition, some instructions may be ongoing, as opposed to a discrete action. For example, an instruction to stay away from the windows needs to be complied with throughout the entire incident, not just immediately following the instruction.

In addition to the complexities involved with dealing with an untrained civilian, 911 call takers may suffer from the problem that they assume that the 911 caller has complied/continues to comply with the provided instructions. For example, the 911 call taker may instruct the 911 caller to lock the door, and assume that the action has been taken. Likewise, the 911 call taker may assume that the instruction to stay away from the windows is being complied with continuously from the point in time when the instruction was given.

The techniques described herein overcome these problems individually and collectively. An artificial intelligence (AI) bot using natural language processing monitors the conversation between the 911 caller and the 911 call taker. The AI bot, based on the type of incident being reported, monitors the conversation for instructions provided by the 911 call taker to the 911 caller. The AI bot may initially monitor the caller for an indication that the instruction has been received, and if not, the call taker may reissue the instruction. For some instructions, compliance may be confirmed via various sensors in the environment and the AI bot may confirm compliance via those sensors. For other instructions, compliance may require confirmation from the 911 caller. The AI bot may provide reminders to the 911 call taker to confirm that the instruction has been complied with/continues to be complied with. Reminder's may be prioritized based on the importance of compliance with the instruction.

Further advantages and features consistent with this disclosure will be set forth in the following detailed description, with reference to the figures.

A method is provided. The method includes monitoring, with an artificial intelligence (AI) bot, a conversation between an emergency caller and an emergency call taker. The method further includes identifying, by the AI bot, at least one instruction issued by the emergency call taker to the emergency caller. The method additionally includes determining, by the AI bot, when execution of the at least one instruction has been confirmed.

In one aspect, determining when execution of the at least one instruction has been confirmed further comprises receiving input from at least one sensor, the at least one sensor configured to verify execution of the at least one instruction. In one aspect, the at least one sensor is one of a door sensor and a camera. In one aspect, determining when execution of the at least one instruction has been confirmed further comprises monitoring, with the AI bot, further communication between the emergency caller and the emergency call taker and identifying, by the AI bot, indications from the emergency caller that the at least one instruction has been executed.

In one aspect, the method further comprises displaying, by the AI bot, a list of instructions that have been issued by the emergency call taker, wherein each instruction in the list of instructions is associated with a status, wherein the status indicates if the instruction has or has not been executed. In one aspect, the method is further comprising removing the at least one instruction from the list of instructions awaiting confirmation once execution of the at least one instruction has been confirmed.

In one aspect, the method is further comprising periodically reminding, by the AI bot, the emergency call taker to ask the emergency caller about any of the at least one instructions whose execution has not been confirmed. In one aspect, when the at least one instruction is an ongoing instruction further comprising periodically verifying, by the AI bot, when execution of the at least one instruction has been confirmed. In one aspect, the method further comprises determining, by the AI bot, when receipt of the at least one instruction has been acknowledged by the emergency caller. In one aspect, the method further comprises prompting the emergency call taker to reissue the at least one instruction when receipt of the at least one instruction has not been acknowledged.

A system is provided. The system includes a processor and a memory. The memory contains a set of instructions thereon that when executed by the processor cause the processor to monitor, with an artificial intelligence (AI) bot, a conversation between an emergency caller and an emergency call taker. The instructions further cause the processor to identify, by the AI bot, at least one instruction issued by the emergency call taker to the emergency caller. The instructions additionally cause the processor to determine, by the AI bot, when execution of the at least one instruction has been confirmed.

In one aspect the instructions to determine when execution of the at least one instruction has been confirmed further comprises instructions to receive input from at least one sensor, the at least one sensor configured to verify execution of the at least one instruction.

In one aspect, the instructions to determine when execution of the at least one instruction has been confirmed further comprises instructions to monitor, with the AI bot, further communication between the emergency caller and the emergency call taker and identify, by the AI bot, indications from the emergency caller that the at least one instruction has been executed.

In one aspect, the system further comprises instructions to display, by the AI bot, a list of instructions that have been issued by the emergency call taker, wherein each instruction in the list of instructions is associated with a status, wherein the status indicates if the instruction has or has not been executed. In one aspect, the system further comprises instructions to periodically remind, by the AI bot, the emergency call taker to ask the emergency caller about any of the at least one instructions whose execution has not been confirmed.

A non-transitory processor readable medium is provided. The medium contains thereon a set of instructions which when executed by a processor cause the processor to monitor, with an artificial intelligence (AI) bot, a conversation between an emergency caller and an emergency call taker. The medium further comprises instructions which cause the processor to identify, by the AI bot, at least one instruction issued by the emergency call taker to the emergency caller. The medium further comprises instructions which cause the processor to determine, by the AI bot, when execution of the at least one instruction has been confirmed.

In one aspect, the instructions on the medium to determine when execution of the at least one instruction has been confirmed further comprises instructions to receive input from at least one sensor, the at least one sensor configured to verify execution of the at least one instruction.

In one aspect the instructions on the medium to determine when execution of the at least one instruction has been confirmed further comprises instructions to monitor, with the AI bot, further communication between the emergency caller and the emergency call taker and identify, by the AI bot, indications from the emergency caller that the at least one instruction has been executed.

In one aspect, the medium further comprises instructions to display, by the AI bot, a list of instructions that have been issued by the emergency call taker, wherein each instruction in the list of instructions is associated with a status, wherein the status indicates if the instruction has or has not been executed. In one aspect, the medium further comprises instructions to periodically remind, by the AI bot, the emergency call taker to ask the emergency caller about any of the at least one instructions whose execution has not been confirmed.

Figure 1:
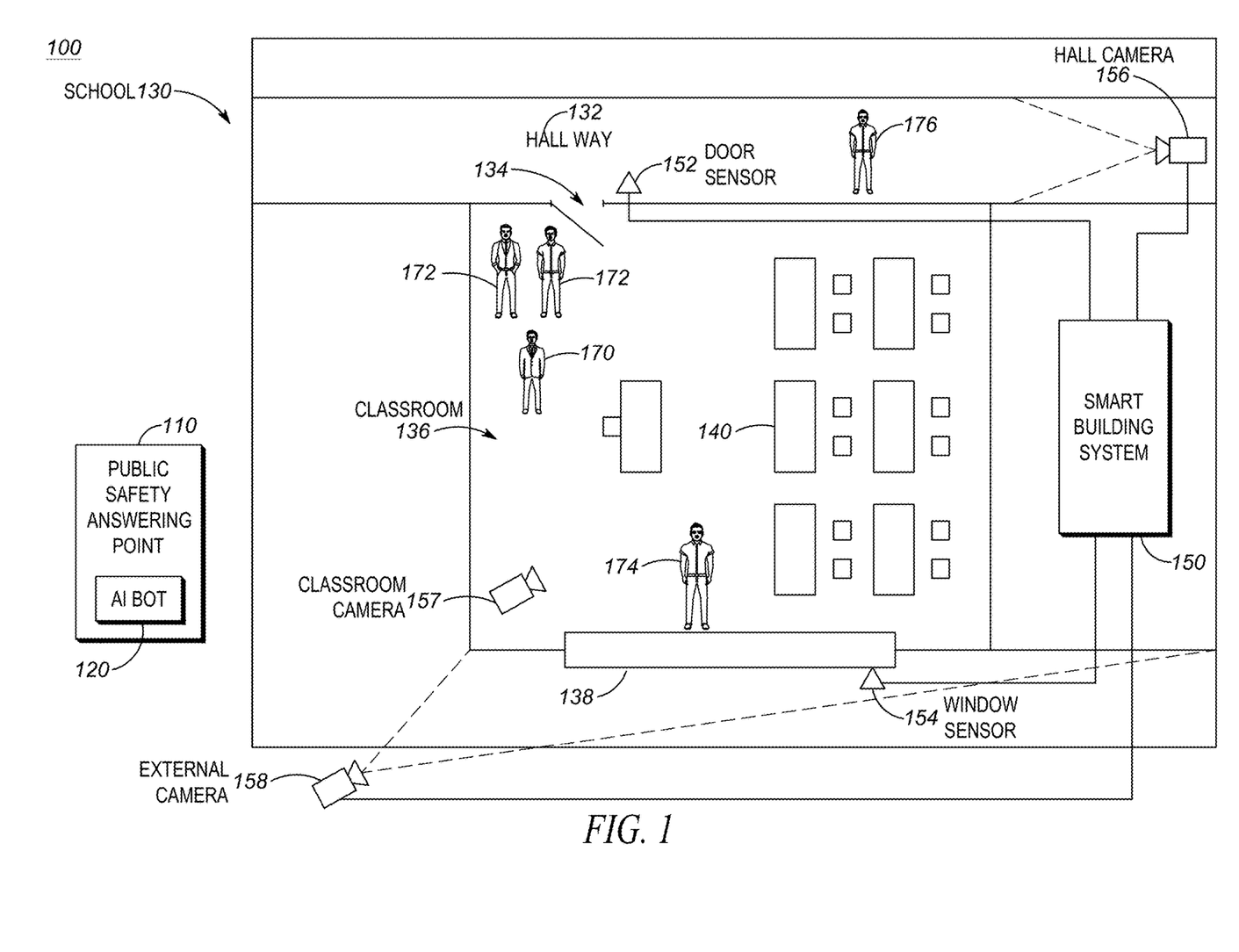
FIG. 1 is an example of an environment in which display and tracking of compliance with instructions provided by an emergency call taker may be implemented in accordance with the techniques described herein.

FIG. 1 is an example of an environment in which display and tracking of compliance with instructions provided by an emergency call taker may be implemented in accordance with the techniques described herein. Environment 100 may include a public safety answering point (PSAP) 110 and a building (e.g. school, office complex, etc.) 130. The PSAP 110 may be a call center where emergency calls, such as calls to 911, are routed. The PSAP 110 may be coupled, either directly or via dispatch centers, to first responders. Personnel at the PSAP 110 may be responsible for coordinating responses by first responders to emergency calls. In addition, call takers at the PSAP may be responsible for providing instructions to 911 callers until first responders arrive on scene. The PSAP 110 may also include an AI bot 120. AI bot 120 may be utilized to implement the techniques described herein. Operation of AI bot 120 is described in further detail below.

Building 130 may be a building where an emergency incident occurs. For example, building 130 may be a school, an office, a home, or any such other location where an emergency incident can occur. An emergency incident can include any type of incident (e.g. active shooter, medical emergency, fire, etc.) that may occur within or around building 130. For purposes of the remainder of this description, building 130 will be described as a school and the emergency incident described will be an active shooter within the school. However, it should be understood that this description is merely for the purposes of ease of description and not by way of limitation.

Building 130 may include a hallway 132. The hallway 132 may have doors that lead to various rooms. For example, door 134 may lead to classroom 136. Classroom 136 may have a window 138. Classroom 136 may include typical class room features, such as desks and chairs 140. In addition, classroom 136 may include students and teachers, the actions of which are described in further detail below.

Building 130 may also be equipped with smart building system 150. Smart building system 150 may be an electronic system that is used to monitor/control certain aspects of the building. For example, the smart building system 150 may be used to control heating, ventilation, and air conditioning (HVAC) systems. More pertinent to the instant description, the smart building system may be integrated with various sensors within building 130 to provide security and other monitoring for the building. Smart building system 150 may be coupled to PSAP 110 and may report the status of various sensors, as will be described in further detail below.

For example, the building 130 may include door sensor 152 coupled to smart building system 150. Door sensor 152 may be able to report if the door 134 is open/shut and/or locked/unlocked. Likewise, building 130 may include window sensor 154 that is able to report the status of window 138. For example, status may include if the window is open/closed and/or locked/unlocked. In some cases, window sensor 154 may be able to report the status of any window coverings (e.g. blinds, curtains, electronic mechanisms) to determine if they currently allow/prevent persons outside the classroom 136 from looking through the window 138.

Building 130 may also include different camera sensors. For example, hall camera 156 may have a field of view (FOV) that covers hallway 132. Smart building system 150 may utilize hall camera 156 to determine if anyone is currently in hallway 132. Likewise, building 130 may include classroom camera 157 whose field of view includes classroom 136. Smart building system 150 may utilize classroom camera 157 to observe what is occurring in classroom 136. Building 130 may also include external camera 158 to monitor the exterior of the building. In the example shown, external camera 158 may have a FOV that include the exterior of building 130, including window 138.

Although an example of a building with a smart building system with several types of sensors is described, it should be understood that the techniques described herein are in no way limited to the specific description. What should be understood is that a building 130 may include a smart building system 150 that is coupled to various sensors 152-158. The smart building system may also be coupled to the PSAP 110 to report the status of those sensors 152-158. As will be explained in further detail below, the status of those sensors, may be used in conjunction with other information, to determine compliance of a 911 caller with instructions provided by a 911 call taker. Although several specific types of sensors are described, it should be understood that the techniques presented are in no way limited by the specific sensors described. Any type of sensor that can be utilized to confirm compliance with instructions, as will be described in further detail below, are usable with the techniques described herein.

In order to aid in the description of the operation of system 100, an edited transcript of an actual 911 emergency call is repeated below. The transcript is edited for purposes of clarity and ease of description. The scenario presented is an active shooter within a school. In the transcript provided below, the 911 caller is aware that this is an active shooter incident.

Call Taker: Okay. Where are you? Are you in the school right now?

Caller: I'm in the school. I'm in the classroom.

Call Taker: Okay. Do you have all your students in the classroom? Is the door locked?

Caller: All of my students. The door is not locked yet. I have to go . . . .

Call Taker: Okay. Lock the door. Keep everybody calm. Get everybody away from the windows.

Caller: Okay. Alright.

Call Taker: Where are you in the school?

Caller: I am in the hallway when you walk in the front entrance and you take a left.

Call Taker: Okay. Do not try to walk down the hallway, ok?

Caller: I will try, okay.

The first set of questions asked by the call taker (where are you? Are you in the school now) are simply the gathering of information. The call taker receives the response (I'm in the school . . . ). There are no instructions provided by the call taker at this point. The next set of questions (Okay. Do you have all your students in the classroom? Is the door locked?) are also information gathering questions. However, the response is indicative of a caller experiencing some level of panic. For example, the response, "All my students" is ambiguous. It cannot be determined if all the students are inside or outside of the classroom. Furthermore, the response, "I have to go . . . " is also ambiguous. It is unclear if the caller is saying they have to go . . . to lock the door, or if they have to go . . . to flee the classroom.

At this point, the call taker starts issuing instructions. 1) Lock the door, 2) Keep everyone calm, 3) Get everyone away from the windows, 4) Do not try to walk down the hallway. The instruction to lock the door requires a discrete action, as the door has either been locked or it has not. The remaining three instructions, require continuous monitoring/verification. For example, although at a particular moment the students may all be calm, that may change at some later period of time. Even in the case of locking the door, it may be necessary to periodically verify that the door has not been unlocked.

In operation, the AI bot 120 may monitor a call from a 911 caller 170 to the PSAP 110. For this example, assume that caller 170 is a teacher assigned to classroom 136. The AI bot 120, using natural language processing may identify instructions issued by the call taker at the PSAP. Techniques to identify commands, which may also be referred to as instructions, utilizing natural language processing are known, and the techniques described herein may utilize any available natural language processing techniques to determine instructions issued by the call taker. A device that may implement the AI bot 120 is described in further detail in FIG. 4.

Furthermore, PSAPs 110 generally operate in accordance with various predetermined procedures/scripts. For example, once the call taker has identified the incident as an active shooter in a school incident type, the call taker may begin using a script prepared for such a scenario. For example, the script may instruct the call taker to provide specific, standard instructions (e.g. lock the door, get everyone away from the windows, etc.). Once the AI bot 120 is made aware of the type of incident, the predetermined scripts for that incident type may be used to aid the AI bot in determining which instructions are expected to be provided by the call taker.

In some implementations, the AI bot 120 may determine if the caller has acknowledged receipt of the instruction. Note, this does not mean the caller has actually complied with the instruction, but rather it means the caller acknowledges an instruction has been received. For example, in the above scenario, in response to the instruction to keep everyone away from the windows, the caller responds, "Okay. Alright," which indicates that the instruction has at least been acknowledged. If there is no acknowledgement of the instruction, the call taker may be prompted to reissue the instruction.

For each instruction, if possible, the AI bot 120 may attempt to communicate with the smart building system 150 to determine if the instruction has been complied with. For example, the first identified instruction was "lock the door." The AI bot 120 may communicate with the smart building system 150 to determine if the door to classroom 136 is currently locked. The smart building system, utilizing door sensor 152, may determine if the door is currently locked or not. This response can be communicated back to the call taker at the PSAP 110. For smart building systems 150 that are not equipped with a door sensor, the process for handling verifications is described in further detail below.

The second instruction was to keep everyone calm. The AI Bot 120 may send a request to smart building system 150 to determine if everyone in classroom 136 is remaining calm. The smart building system 150 may utilize classroom camera 157 to detect if the people within classroom 136 appear calm or agitated (e.g. people screaming, running around, sitting quietly, etc.). However, in some cases, the smart building system 150 may not be able to adequately determine that everyone is "calm" due to the fact that the definition of "calm" may be quite subjective. The process for handling verification of instructions that cannot be determined by the smart building system is described in further detail below.

The third instruction was to get everyone away from the windows. The AI bot 120 may send a request to smart building system 150 to determine if everyone in classroom 136 is away from the windows 138. The smart building system may utilize class room camera 157 to determine if everyone is away from the windows 138. For example, students 172 do not appear to be within the area around the window. However, student 174 may be determined to be in front of the window. In addition, the smart building system 150 may utilize external camera 158 to detect if anyone is appearing in its field of view, which includes the window 138. The process for handling verification of instructions that cannot be determined by the smart building system is described in further detail below.

The fourth instruction in this example scenario is to not try to walk down the hallway (e.g. stay in the room). The AI bot 120 may send a request to smart building system 150 to determine if anyone is walking down the hallway 132 by utilizing hall camera 156. If hall camera 156 detects a person 176 in its field of view, it can inform the AI bot 120 that there is someone in the hallway. The process for handling verification of instructions that cannot be determined by the smart building system is described in further detail below.

Although examples of specific instructions and specific sensors which can confirm compliance with those instructions have been described, the techniques described herein are not so limited. Any sensor that could be used to verify compliance with an instruction could be utilized. For example, gas sensors, motion sensors, vibration sensors, temperature sensors, smoke sensors, or any other type of sensor could be utilized. What should be understood is that any type of sensor capable of confirming compliance with an instruction could be utilized.

In some cases, the smart building system 150 may not be able to confirm that the instructions from the call taker have been complied with. For example, as described above, the smart building system 150 may not be sophisticated enough to determine if everyone is remaining "calm" because being calm is a subjective factor. Likewise, the smart building system 150 may not be equipped with the sensors necessary to confirm compliance with 911 call takers instructions. For example, if there is no door sensor 152, the smart building system 150 would not be able to report on the locked status of door 134. In the most extreme case the building 130 may not even include a smart building system 150 at all. In such cases, call taker may have to manually confirm compliance with some, or possibly even all, of his instructions.

Figure 2A:
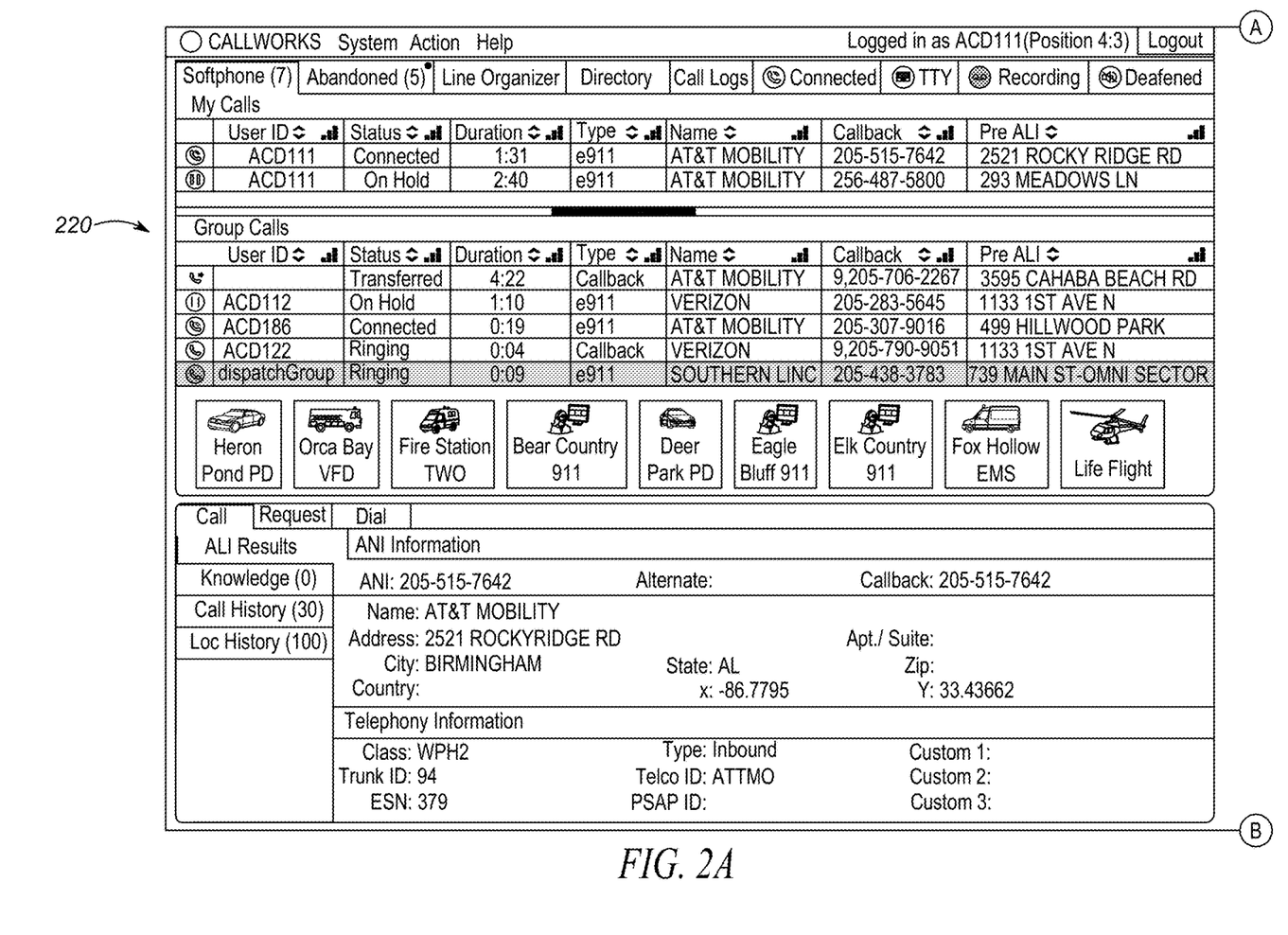
FIGS. 2A,B are an example of a display that may be used in accordance with the display and tracking of compliance with instructions provided by an emergency call taker techniques described herein.
Figure 2B:
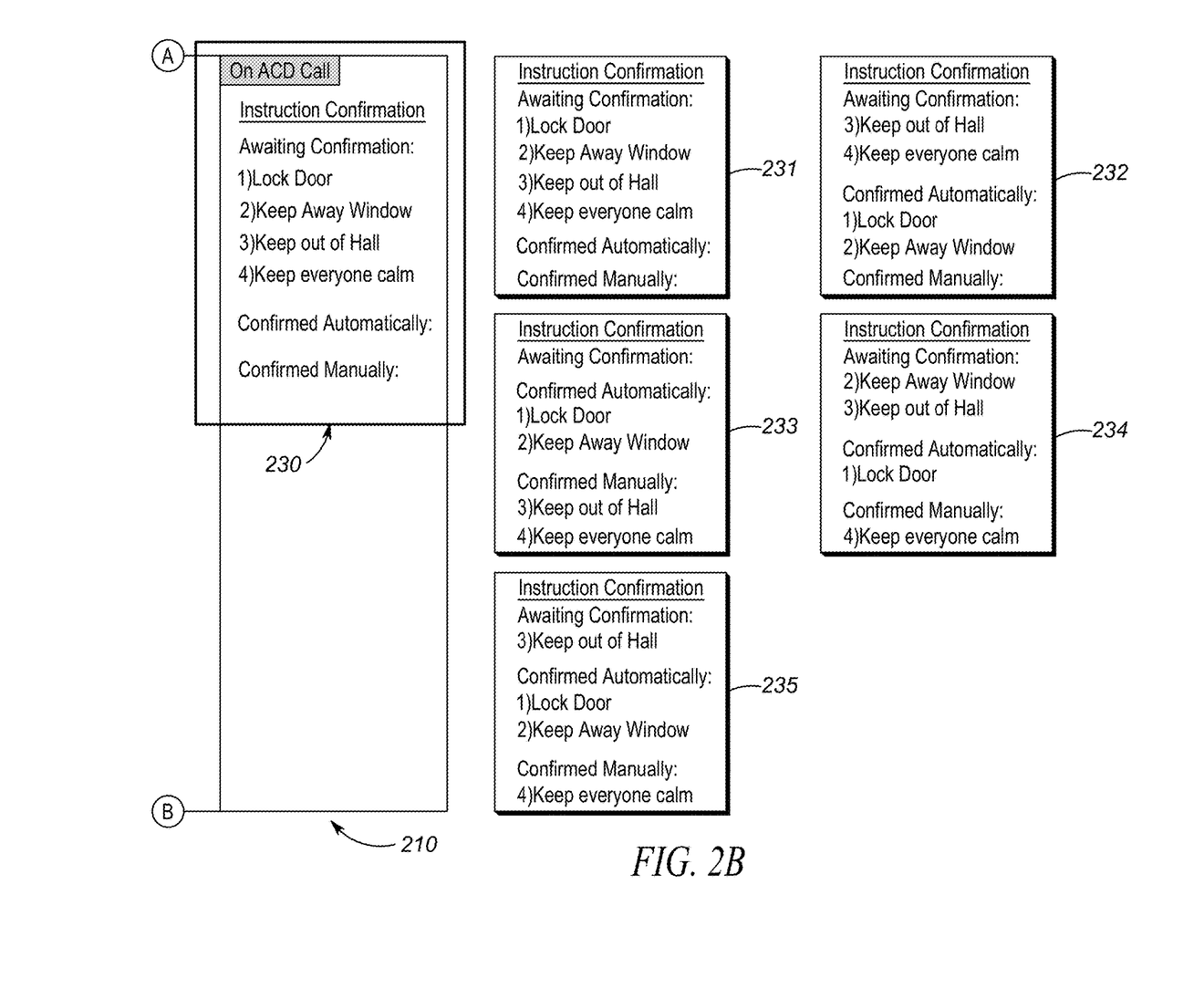

The call taker may manually confirm compliance with instructions by asking the 911 caller if the instruction has been complied with. As the AI bot 120 is monitoring the conversation between the call taker and the caller, the AI bot is able to identify when the caller is responding to a question from the call taker. If the AI bot 120 determines the caller has answered the question about compliance in the affirmative, the AI bot behaves just as if the confirmation came from the smart building system 150. If the AI bot 120 is unable to determine if the caller has answered the question about compliance with the instruction in the affirmative, the confirmation will remain pending. Handling of confirmation of instructions is described in further detail with respect to FIG. 2.

The AI bot 120 may prioritize the importance of each instruction given, as the order that the instructions were conveyed by the 911 call taker may not represent the actual importance of each instruction. For example, in the present example, the second instruction, keep everyone calm, may actually be less important than keeping everyone away from the windows and keeping out of the hallway. The AI bot 120 may prioritize the determined instructions in order to display them in a prioritized order to a call taker. An example of a display is described with respect to FIG. 2B.

The AI bot 120 may then begin a process of confirming that a call takers instructions have been complied with. For instructions that are a discrete event, such as lock the door, the AI bot 120 may attempt to verify with the smart building system 150 that the door has been locked. If so, the instruction may be marked as having been complied with. If the smart building system 150 is unable to confirm the door has been locked (e.g. door sensor not present, etc.), the AI bot 120 prompt the call taker to, at some point later in the conversation, confirm with the 911 caller that the instruction has been complied with.

In some implementations, because locking the door is a discrete action, no additional reminders are sent once compliance with the instruction has been confirmed (either by the smart building system or by manually querying the 911 caller). However, in other implementations, even though locking the door is a discrete action, it may be treated as an instruction that requires continuous monitoring, as will be described in further detail below.

The instruction to keep everyone away from the windows is not a discrete action. At a given point in time, everyone may be away from the window. The AI bot 120 may have confirmed this, either through interaction with the smart building system or via manual query to the 911 caller. However, at a later time, someone in the classroom may move in front of the window. As such, compliance with the instruction to stay away from the windows may need to be verified periodically (e.g. every minute, every five minutes, etc.). Similarly, verification of compliance with staying out of the hallway may need to be periodically confirmed.

It should additionally be noted that the period of verification need not be constant, and may actually differ based on the priority of the instruction. For example, as mentioned above, verifying that everyone is remaining calm may be of a lower priority, and thus may only need to be verified every 10 minutes, as opposed to the faster verification period of staying away from the windows.

FIGS. 2A,B is an example of a display that may be used in accordance with the display and tracking of compliance with instructions provided by an emergency call taker techniques described herein. For purposes of this description, the display screen 210 may be split into two logical components, the legacy portion 220 and the instruction confirmation portion 230 that is introduced by the techniques described herein.

FIG. 2A generally describes a legacy portion of a 911 call takers display screen. The legacy portion 220 of display screen 210 may include any information that is included in existing call handling/call taking software. Information can include location of the caller (e.g. address), contact information of the caller, nature of the incident that is being reported, a list of all other calls in progress. In the case where the call taker is also acting as a first responder dispatcher, the legacy portion of the display may also include dispatch information, such as available first responder units, etc. What should be understood is that the legacy portion of the display includes information that may currently exist in currently available call taking system software.

FIG. 2B presents the portion of the display related to the techniques described herein. For example, display screen 210 may be an example of a user interface on a computer screen that is utilized by a 911 call taker to display the instruction confirmation portion. Although separate logical portions are described, this is not to imply the portions are on different displays. The portions may reside on the same display, on different displays, or in some combination with portions of each logical portion combined on multiple displays.

The techniques herein introduce a new portion of the display screen 210 which is referred to as the instruction confirmation portion 230. In the instruction confirmation portion of the display, the instructions identified by the AI bot 120 can be displayed. In particular, the instructions can be displayed in a prioritized order.

Following along with the example scenario described above with respect to FIG. 1, initially the AI bot 120 may have identified four instructions provided by the call taker to the 911 caller. Because compliance with these instructions has not yet been confirmed, the instructions are all listed under the awaiting confirmation section of the instruction confirmation portion of the display screen 230. Because nothing has been confirmed yet, the confirmed automatically and confirmed manually sections are currently empty.

If the AI bot 120 is able to directly confirm compliance with an instruction with the smart building system 150, the instruction may be moved to the confirmed automatically section. As shown in box 231, which is a representation of instruction confirmation portion 230 at a later period in time, the instruction to lock the door has been confirmed automatically. The instruction to keep everyone out of the hall has also been confirmed automatically.

If an instruction is not able to be confirmed automatically, it remains in the awaiting confirmation portion, which is an indication to the call taker that he must confirm compliance with the instruction manually. For example, the call taker must ask the 911 caller if the instruction has been complied with. Although this is not as error proof as automatic confirmation, it is still an improvement from where an instruction is sent and no follow up confirmation of instruction compliance is obtained at all. As shown in box 232, the instructions to verify compliance with staying out of the hallway and keeping everyone calm have not been confirmed automatically via interaction with the smart building system. This may prompt the call taker to interact with the caller to confirm compliance with the instructions.

Box 233 shows the instruction confirmation portion after the call taker has confirmed that the 911 caller has complied with the instructions that could not be automatically verified. As shown, compliance with the instructions to stay out of the hallway and keep everybody calm have been confirmed by the call taker, as indicated by the presence of those two instructions in the confirmed manually section.

As mentioned above, certain instruction may require periodic verification of continued compliance. As shown in box 234, which represents the instruction confirmation portion after a period of time has passed, the instructions to keep everyone away from the windows and keep everyone out of the hall has returned to the awaiting confirmation section, indicating that those instructions need to be confirmed again.

Because the instruction to keep everyone out of the hall was able to be confirmed automatically, it is expected that it will not remain in the awaiting confirmation section for long, as shown in box 235. The AI bot 120 could immediately verify ongoing confirmation by directly interacting with the smart building system 150. However, the instruction to keep out of hall requires manually confirmation. As such, it remains in the awaiting confirmation section until the call taker manually confirms compliance, at which point it may move to the manually confirmed section.

Additionally, it should be noted that the movement of an instruction periodically from the automatically/manually confirmed section back to the awaiting confirmation section is based on the defined period for reconfirmation. If an instruction is discrete, like the lock the door instruction, once confirmed it may remain in the respective confirmed section, and would not move back to the awaiting confirmation section.

It should also be noted that if an item remains in the awaiting confirmation section for too long a period of time, the call takers attention may be directed to the item via any number of techniques. For example, the item may begin flashing, change colors, become bold face type, an alarm may sound, or any other technique may be used to grab the attention of the call taker and notify him that there are instruction compliance items that need to be manually verified.

It should be noted that FIG. 2 describes only one example way of indicating which instructions have been confirmed. Other techniques may include color coding to indicate which instructions have been confirmed, text to indicate which instructions have been confirmed, either manually or automatically, a card semantic based interface with separate cards for instructions awaiting confirmation, automatically confirmed, or manually confirmed. What should be understood is that any user interface that is capable of notifying a call taker as to which instructions need to be confirmed and which instructions have already been confirmed (either automatically or manually) would be applicable for use with the techniques described herein.

Figure 3:
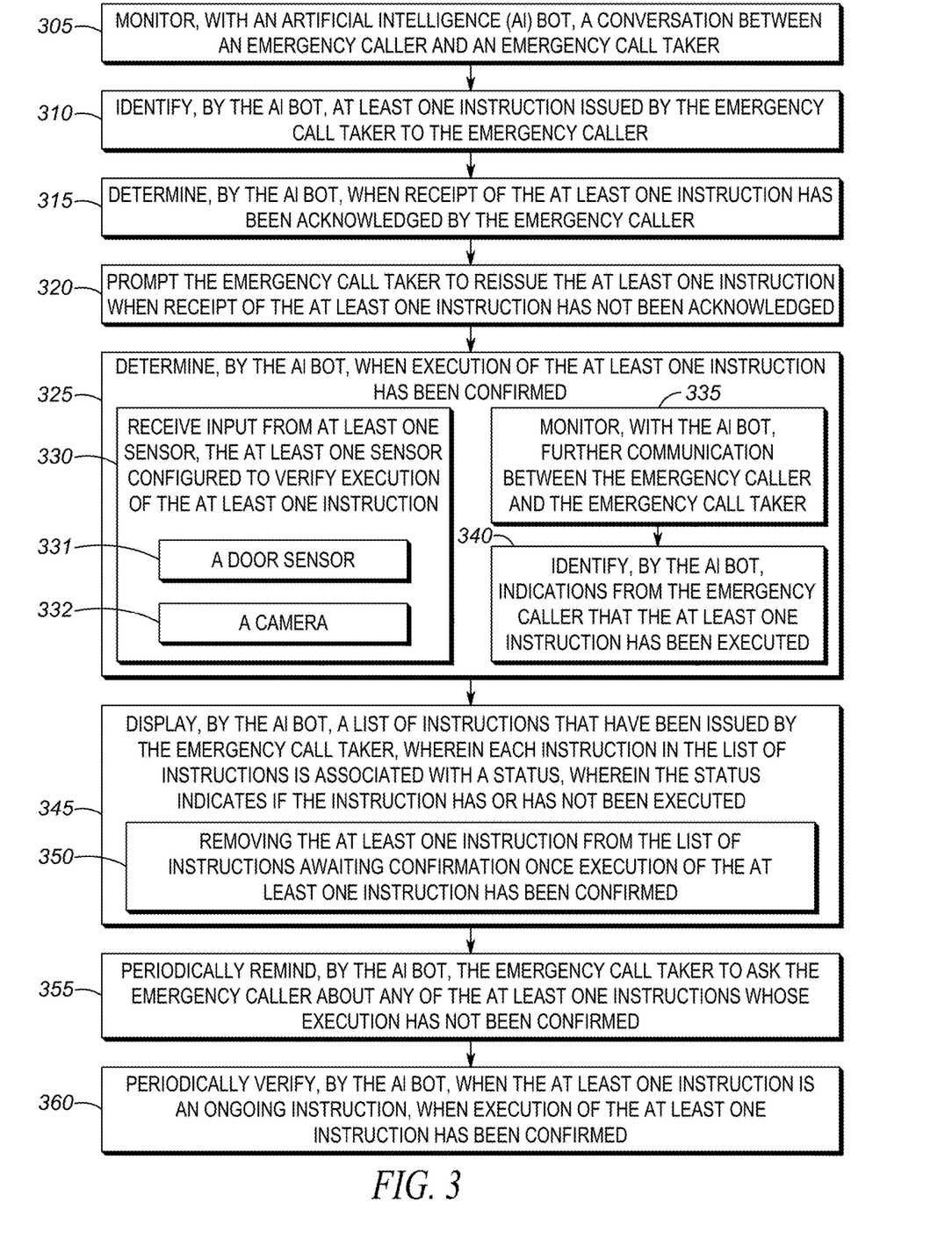
FIG. 3 is an example of a flow diagram for the display and tracking of compliance with instructions provided by an emergency call taker techniques described herein.

FIG. 3 is an example of a flow diagram for the display and tracking of compliance with instructions provided by an emergency call taker techniques described herein. In block 305 an artificial intelligence (AI) bot monitors a conversation between an emergency caller and an emergency call taker. For example, the AI bot may be coupled to the PSAP in such a way as to be able to listen to both sides of a conversation between a caller and call taker. In one example implementation, this may be achieved through use of a loop around trunk. In an internet protocol implementation, the AI bot may receive a copy of the voice packet flows between the caller and call taker.

In block 310 the AI bot identifies at least one instruction issued by the emergency call taker to the emergency caller. As mentioned above, by utilizing available natural language processing techniques, commands/instructions from the call taker to the caller may be determined. Further aiding in the identification of instructions is that the PSAP generally has predefined scripts when responding to a particular incident type. Once an incident type is known, the predefined script provides a pretty good prediction of the instructions that will actually be sent to the caller.

In block 315, the AI bot may determine when receipt of the at least one instruction has been acknowledged by the emergency caller. This does not mean that the instruction has been complied with. Rather it means that the caller has acknowledged that an instruction has been given. The indication an acknowledgement of the instruction indicates that the caller is at least coherent enough to understand what is being said to him. In block 320 the emergency call taker is prompted to reissue the at least one instruction when receipt of the at least one instruction has not been acknowledged. If the instruction has not been acknowledged, it is likely that the instruction was not heard and/or understood. If the instruction was not heard and/or understood, the chances of the instruction being complied with are low. However, it should be understood that the acknowledgement of the receipt of the instruction and further reissue of the instruction when unacknowledged are optional. If the instruction is not acknowledged, and ends up not being complied with, the instruction will not be indicated as confirmed. As such, the call taker will be prompted to reissue the instruction, as is described in further detail below.

In block 325, the AI bot may determine when execution of the at least one instruction has been confirmed. Execution of the instruction is synonymous with compliance with the instruction. As explained above, the confirmation can come in two different ways. In the first way, the building may be equipped with a smart building system that includes sensors. In block 330, input is received from at least one sensor configured to verify execution of the at least one instruction. Sensors may include devices such as door sensors or cameras as depicted by blocks 331 and 332 respectively. As explained above, only two example sensors are described here, however the techniques described herein are not limited to any particular types of sensors. In other words, the smart building system itself is able to confirm with to the AI bot that the instruction has been complied with.

In the second way, confirmation comes from the caller directly. In block 335, the AI bot monitors further communication between the emergency caller and the emergency call taker. In block 340, the AI bot identifies indications form the emergency caller that the at least one instruction has been complied with. For example, a response from the caller indicating, "I have locked the door."

In block 345, the AI bot displays a list of instructions that have been issued by the emergency call taker, wherein each instruction in the list of instructions is associated with a status, wherein the status indicates if the instruction has or has not been executed. For example, the display may be at a call taking computer system utilized by call takers at the PSAP. The display may show all instructions that have been issued, and if compliance with those instructions has been confirmed, either manually or automatically.

In block 350 the at least one instruction may be removed from the list of instructions awaiting confirmation one execution of the at least one instruction has been confirmed. In other words, once the execution of the instruction has been confirmed, there is no longer a need to wait for confirmation as it has already been received. As will be explained further below, in some cases, the confirmation is repeated.

In block 355 the AI bot periodically reminds the emergency call taker to ask the emergency caller about any of the at least one instructions whose execution has not been confirmed. In other words, if the AI bot has not been able to confirm compliance with an instruction (either manually or automatically) the emergency call taker may be reminded to ask the caller about such instructions. Asking the caller may include reissuing the instruction.

In block 360, the AI bot may periodically verify, when the instruction is an ongoing instruction, when execution of the at least one instruction has been confirmed. In other words, for ongoing instructions, compliance needs to be periodically verified. For example, is everyone still away from the windows? In such cases, the AI bot may periodically move the instruction back into the list of instructions awaiting confirmation. The process then effectively moves back to block 325.

Figure 4:
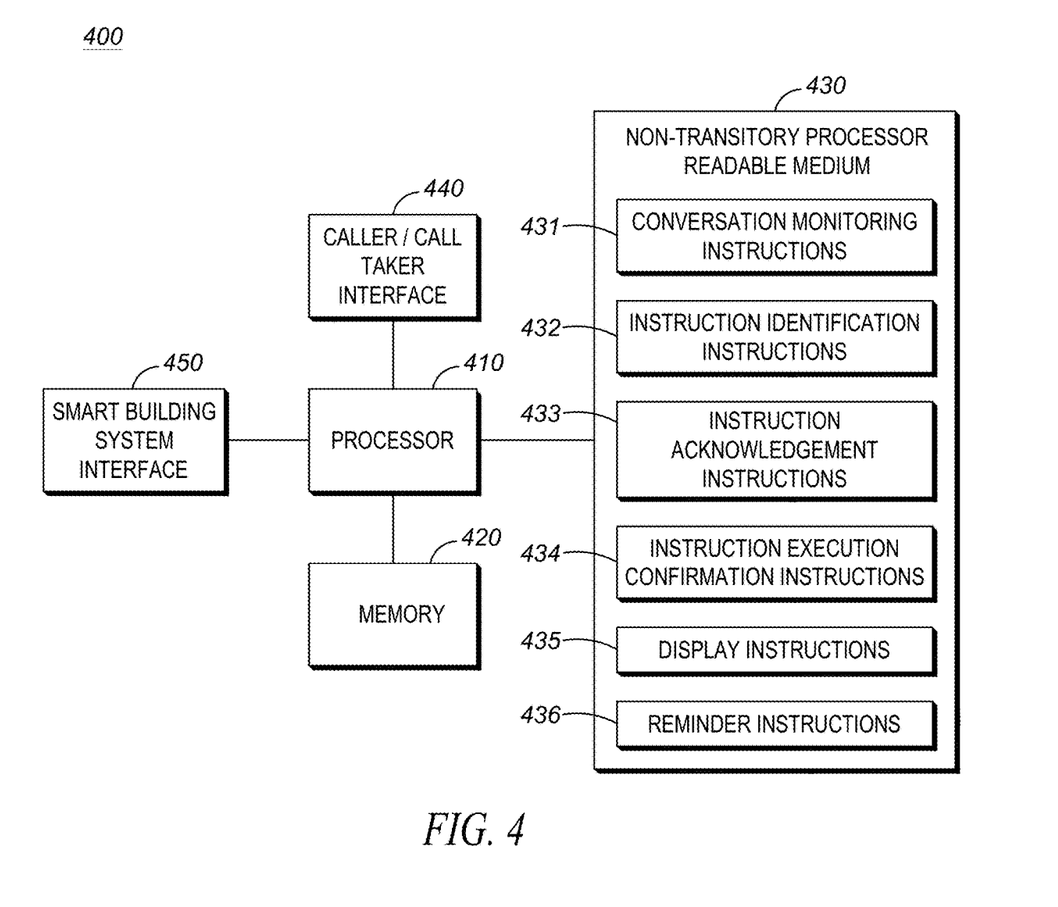
FIG. 4 is an example of a device that may implement the display and tracking of compliance with instructions provided by an emergency call taker techniques described herein.

FIG. 4 is an example of a device that may implement the display and tracking of compliance with instructions provided by an emergency call taker techniques described herein. It should be understood that FIG. 4 represents one example implementation of a computing device that utilizes the techniques described herein. Although only a single processor is shown, it would be readily understood that a person of skill in the art would recognize that distributed implementations are also possible. For example, the various pieces of functionality described above (e.g. instruction detection, compliance verification, display, etc.) could be implemented on multiple devices that are communicatively coupled. FIG. 4 is not intended to imply that all the functionality described above must be implemented on a single device.

Device 400 may include processor 410, memory 420, non-transitory processor readable medium 430, caller/call taker interface 440, and smart building system interface 450.

Processor 410 may be coupled to memory 420. Memory 420 may store a set of instructions that when executed by processor 410 cause processor 410 to implement the techniques described herein. Processor 410 may cause memory 420 to load a set of processor executable instructions from non-transitory processor readable medium 430. Non-transitory processor readable medium 430 may contain a set of instructions thereon that when executed by processor 410 cause the processor to implement the various techniques described herein.

For example, medium 430 may include conversation monitoring instructions 431. The conversation monitoring instructions 431 may cause the processor to utilize the caller/call taker interface 440 to monitor conversations that occur between an emergency caller and an emergency call taker. The caller/call taker interface may intercept communications between the caller and the call taker at the PSAP. The conversation monitoring instructions 431 may utilize any available natural language processing techniques to aid in monitoring the conversation. The conversation monitoring instructions 431 are described throughout the specification including places such as blocks 305 and 335.

Medium 430 may include instruction identification instructions 432. Instruction identification instructions 432 may cause the processor to determine instructions that were provided by the emergency call taker to the emergency caller. The identification may be based on the conversation monitoring instructions 431. In addition, the instructions could also be based on expected instructions as determined by expected instruction for specific incident types. The instruction identification instructions 432 are described throughout the specification including places such as block 310.

Medium 430 may include instruction acknowledgement instructions 433. Instruction acknowledgement instructions may cause the processor to determine when an emergency caller has acknowledged (although not yet necessarily complied with) an instruction. If there is no acknowledgement, as determined by conversation monitoring instructions 431, the caller instruction can be reissued by the call taker. The instruction acknowledgement instructions 433 are described throughout the specification including places such as blocks 315 and 320.

Medium 430 may include instruction execution confirmation instructions 434. Instruction execution confirmation instructions 434 may cause the processor to determine if an instruction has been complied with (e.g. executed). This may be done automatically by interfacing directly with the building where the emergency caller is located via the smart building system interface 450. Through the smart building system interface 450, the processor may determine compliance via sensors associated with the building. The confirmation may also be done manually by monitoring the interactions between the caller and call taker with the conversation monitoring instructions 431 to detect confirmation by the caller that the instructions were complied with. The instruction execution confirmation instructions 434 are described throughout the specification including places such as blocks 325-332, and 340

Medium 430 may include display instructions 435. Display instructions 435 may cause the processor to display an indication of which instructions have been confirmed as being executed (either manually or automatically) and which instructions are awaiting confirmation. The display instructions 435 are described throughout the specification including places such as blocks 345 and 350.

Medium 430 may include reminder instructions 436. Reminder instructions 436 may cause the processor to provide a reminder to the call taker to confirm any instructions that have not yet been confirmed. The reminder can be for instructions that have not been initially confirmed. The reminder could also be for instructions that require periodic verification of execution. The reminder instructions 436 are described throughout the specification including places such as blocks 355 and 360.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot [include a particular function/feature from current spec], among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
monitoring, with an artificial intelligence (AI) bot, a conversation between an emergency caller and an emergency call taker;
identifying, by the AI bot, at least one instruction issued by the emergency call taker to the emergency caller; and
determining, by the AI bot, based on at least one of sensor input and emergency caller answers, when execution of the at least one instruction has been confirmed.

2. The method of claim 1 wherein determining when execution of the at least one instruction has been confirmed further comprises:
receiving the sensor input from at least one sensor, the at least one sensor configured to verify execution of the at least one instruction.

3. The method of claim 2, wherein the at least one sensor is one of:
a door sensor; and
a camera.

4. The method of claim 1 wherein determining when execution of the at least one instruction has been confirmed further comprises:
monitoring, with the AI bot, further communication between the emergency caller and the emergency call taker; and
identifying, by the AI bot, indications from the emergency caller that the at least one instruction has been executed.

5. The method of claim 1 further comprising:
displaying, by the AI bot, a list of instructions that have been issued by the emergency call taker, wherein each instruction in the list of instructions is associated with a status, wherein the status indicates if the instruction has or has not been executed.

6. The method of claim 5 further comprising:
removing the at least one instruction from the list of instructions awaiting confirmation once execution of the at least one instruction has been confirmed.

7. The method of claim 1 further comprising:
periodically reminding, by the AI bot, the emergency call taker to ask the emergency caller about any of the at least one instructions whose execution has not been confirmed.

8. The method of claim 1 wherein when the at least one instruction is an ongoing instruction:
periodically verifying, by the AI bot, when execution of the at least one instruction has been confirmed.

9. The method of claim 1 further comprising:
determining, by the AI bot, when receipt of the at least one instruction has been acknowledged by the emergency caller.

10. The method of claim 9 further comprising:
prompting the emergency call taker to reissue the at least one instruction when receipt of the at least one instruction has not been acknowledged.

11. A system comprising:
a processor; and
a memory, the memory containing thereon a set of instructions that when executed by the processor cause the processor to:
monitor, with an artificial intelligence (AI) bot, a conversation between an emergency caller and an emergency call taker;
identify, by the AI bot, at least one instruction issued by the emergency call taker to the emergency caller; and
determine, by the AI bot, based on at least one of sensor input and emergency caller answers, when execution of the at least one instruction has been confirmed.

12. The system of claim 11 wherein the instructions to determine when execution of the at least one instruction has been confirmed further comprises instructions to:
receive the sensor input from at least one sensor, the at least one sensor configured to verify execution of the at least one instruction.

13. The system of claim 11 wherein the instructions to determine when execution of the at least one instruction has been confirmed further comprises instructions to:
monitor, with the AI bot, further communication between the emergency caller and the emergency call taker; and
identify, by the AI bot, indications from the emergency caller that the at least one instruction has been executed.

14. The system of claim 11 further comprising instructions to:
display, by the AI bot, a list of instructions that have been issued by the emergency call taker, wherein each instruction in the list of instructions is associated with a status, wherein the status indicates if the instruction has or has not been executed.

15. The system of claim 11 further comprising instructions to:
periodically remind, by the AI bot, the emergency call taker to ask the emergency caller about any of the at least one instructions whose execution has not been confirmed.

16. A non-transitory processor readable medium containing a set of instruction thereon that when executed by a processor cause the processor to:
monitor, with an artificial intelligence (AI) bot, a conversation between an emergency caller and an emergency call taker;
identify, by the AI bot, at least one instruction issued by the emergency call taker to the emergency caller; and
determine, by the AI bot, based on at least one of sensor input and emergency caller answers, when execution of the at least one instruction has been confirmed.

17. The medium of claim 16 wherein the instructions to determine when execution of the at least one instruction has been confirmed further comprises instructions to:
receive the sensor input from at least one sensor, the at least one sensor configured to verify execution of the at least one instruction.

18. The medium of claim 16 wherein the instructions to determine when execution of the at least one instruction has been confirmed further comprises instructions to:
monitor, with the AI bot, further communication between the emergency caller and the emergency call taker; and
identify, by the AI bot, indications from the emergency caller that the at least one instruction has been executed.

19. The medium of claim 16 further comprising instructions to:
display, by the AI bot, a list of instructions that have been issued by the emergency call taker, wherein each instruction in the list of instructions is associated with a status, wherein the status indicates if the instruction has or has not been executed.

20. The medium of claim 16 further comprising instructions to:
   periodically remind, by the AI bot, the emergency call taker to ask the emergency caller about any of the at least one instructions whose execution has not been confirmed.

\* \* \* \* \*